(12) United States Patent
Kodama et al.

(10) Patent No.: US 6,212,013 B1
(45) Date of Patent: Apr. 3, 2001

(54) PROJECTION TYPE DISPLAY APPARATUS

(75) Inventors: Hiroyuki Kodama, Tokyo; Atsushi Okuyama, Tokorozawa, both of (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/382,447

(22) Filed: Aug. 25, 1999

(30) Foreign Application Priority Data

Aug. 23, 1999 (JP) .................................................. 11-235479
Aug. 27, 1999 (JP) .................................................. 10-256118

(51) Int. Cl.$^7$ .............................. G02B 27/14; G02B 5/10
(52) U.S. Cl. ............................ 359/634; 359/853; 359/869
(58) Field of Search .................................... 359/869, 853, 359/727, 641, 634

(56) References Cited

U.S. PATENT DOCUMENTS 5,986,815  11/1999  Bryars .................................. 359/634

FOREIGN PATENT DOCUMENTS 7072450   3/1995  (JP) .

*Primary Examiner*—Georgia Epps
*Assistant Examiner*—Michael A. Lucas
(74) *Attorney, Agent, or Firm*—Morgan & Finnegan, LLP

(57) ABSTRACT

A projection type display apparatus is arranged to be able to implement both brightness-priority display and color-reproduction-priority display by itself. In the display apparatus, white light from a light source 1 is separated into beams of three colors by a color separation optical system comprised of a combination of dichroic mirrors DM1, DM2, total reflection mirrors M1, M2, M3, etc., and the beams of the three colors are made incident to liquid-crystal display units 8R, 8G, 8B. After that, the beams are combined by a dichroic prism 9 and images of the liquid-crystal display units 8R, 8G, 8B are projected by a projection lens 10. In this display apparatus, a dichroic filter DF for transmitting light in a region not less than a certain wavelength (for example, about 600 nm) but intercepting light in the other region is arranged so as to be able to be put into or out of an optical path immediately before the liquid-crystal display unit 8R. When the dichroic filter DF is not put in the optical path, the light in the wavelength region not less than about 570 nm is used as projection light. When the dichroic filter DF is put in the optical path, the light in the region not less than about 600 nm is used as projection light in the red band.

5 Claims, 13 Drawing Sheets

PROJECTION TYPE DISPLAY APPARATUS

BACKGROUND OF THE INVENTION

1. Field of the Invention

The present invention relates to a projection type display apparatus used for video display, large-screen display, and so on.

2. Related Background Art

In recent years the variety of use of display apparatus has increased in the fields of image processing etc. and thus there are needs for display devices capable of implementing optimum chromatic purity, chromatic balance, illuminance, and so on according to their use.

FIG. 10 shows an example of the conventional projection type display apparatus.

In the figure, white light emitted from a light source unit 1 having a reflector 2 travels through fly-eye lenses 3 and 4, a PS converter 5, a condenser lens 6, etc. and thereafter a dichroic mirror DM1 as a first optical system transmits red band light R but reflects green and blue band light. Then the red band light transmitted by the dichroic mirror DM1 is reflected by a total reflection mirror M1 to change its optical path by 90° and it then travels through a field lens 7R and a trimming filter TR into a red liquid-crystal display unit 8R comprised of an image display element, in which the red band light is optically modulated according to an input signal. The light thus optically modulated is incident to a dichroic prism 9 for combining as a second optical system, and the dichroic prism 9 changes the optical path of the red light by 90° into a projection lens 10.

On the other hand, among the green and blue band light reflected by the dichroic mirror DM1 so as to change its optical path by 90°, the green band light G is reflected by another dichroic mirror DM2 also acting as a first optical system to change its optical path by 90° and then it travels through a field lens 7G and a trimming filter TG into a green liquid-crystal display unit 8G comprised of an image display element, in which the green band light is optically modulated according to an input signal. The light thus optically modulated is incident to the dichroic prism for combining 9 and then into the projection lens 10. Further, the blue band light B transmitted by the dichroic mirror DM2 travels via a condenser lens 11, a total reflection mirror M2, a relay lens 12, a total reflection mirror M3, and a field lens 7B into a blue liquid-crystal display unit 8B comprised of an image display element, in which the blue band light is optically modulated according to an input signal. The light thus optically modulated is incident to the combining dichroic prism, and the dichroic prism 9 changes the optical path of the blue light by 90° into the projection lens 10.

Then trichromatic light combined by the combining dichroic prism is projected by the projection lens 10.

A light source of the light source unit 1 is normally selected from a halogen lamp, a metal halide lamp, UHP (available from Philips Inc.: registered trademark), and so on, the dichroic mirrors DM1 and DM2 have their spectral transmittances illustrated in FIG. 11A and FIG. 11B, respectively, and the trimming filters TR and TG have their spectral transmittances as illustrated in FIG. 11C and FIG. 11D, respectively.

In the conventional projection type display apparatus constructed as described above, where the contrast was sufficiently high in each of the liquid-crystal panels, the chromatic purity of the red band light was determined by the spectral property of the light-source light and the spectral transmittances of the dichroic mirror DM1 and the trimming filter TR, the chromatic purity of the green band light was determined by the spectral property of the light-source light and the spectral transmittances of the dichroic mirrors DM1, DM2 and the trimming filter TG, the chromatic purity of the blue band light was determined by the spectral property of the light-source light and the spectral transmittances of the dichroic mirrors DM1, DM2, and the optical elements were designed so as to gain the optimum chromatic balance and chromatic purity.

Incidentally, there are such various demands that bright display is required even with a penalty of size increase of the apparatus, that bright display is required even with a penalty of degradation of chromatic purity, that the chromatic purity is not required in a white/black mode, and so on, depending upon use purposes of the projection type display apparatus.

The convectional projection type display apparatus implemented the optimum chromatic balance and chromatic purity by cutting the light in the wavelength region of 570 nm to 600 nm in order to enhance the chromatic purity.

However, many lamps have a peak near 580 nm in their spectral distribution, and use of wavelengths near it contributes to increase of illuminance.

There is thus the known projection type display apparatus with a mechanism for putting a band cut filter as an optical element (DF) capable of varying the chromatic purity into or out of the optical path, which is described in Japanese Patent Application Laid-Open No. 7-72450.

This projection type display apparatus was a single device capable of implementing both brightness-priority display and color-reproduction-priority display, but it had a problem that in the color-reproduction-priority display the display became darker than necessary, because the band cut filter was likely to lower the transmittance even at the wavelengths necessary for the projection.

SUMMARY OF THE INVENTION

In view of the problem of the prior art example described above, an object of the present invention is to provide an improved projection type display apparatus capable of implementing both the brightness-priority display and color-reproduction-priority display by itself.

In order to accomplish the above object, the present invention adopts an optical element such as an edge filter for transmitting light in a region not less than a predetermined wavelength but intercepting light in the other region in the visible region or for transmitting light in a region not more than a predetermined wavelength but intercepting light in the other region in the visible region, for selectively carrying out the brightness-priority display and the color-reproduction-priority display in the projection display apparatus. The present invention can also be applied to the projection type display apparatus of various structures independently of types and the number of image display elements.

One aspect of the invention is characterized by a projection type display apparatus for separating light from a light source into a plurality of light beams of mutually different colors, guiding the light beams of the respective colors into corresponding pixel groups among a plurality of pixel groups, and projecting beams of the respective colors from the plurality of pixel groups, wherein purity of at least one color is made variable by use of an optical element for transmitting light in a region not less than a predetermined wavelength but intercepting light in the other region in the visible region or for transmitting light in a region not more than a predetermined wavelength but intercepting light in the other region in the visible region, and it can be constructed in such a form that the plurality of pixel groups are provided in a plurality of (normally three) image display elements different from each other or in such a form that the plurality of pixel groups are provided in a single image display element.

Another aspect of the invention is characterized by a projection type display apparatus for separating light from a light source into a plurality of light beams of mutually different colors, guiding the light beams of the respective colors into corresponding pixel groups among a plurality of pixel groups, and projecting beams of the respective colors from the plurality of pixel groups, wherein an optical element for enhancing purity of a predetermined color by transmitting light in a region not less than a predetermined wavelength but intercepting light in the other region in the visible region or by transmitting light in a region not more than a predetermined wavelength but intercepting light in the other region in the visible region is arranged so as to be able to be put into or out of a predetermined optical path and/or so as to be able to be inclined with respect to the predetermined optical path; therefore, switching between the brightness-priority display and the color-reproduction-priority display is effected by the edge filter, so that the transmittance is higher at wavelengths necessary for projection than in the case of the band cut filter and so that reduction of light amount can be restrained to the minimum on the occasion of the color-reproduction-priority display.

Another aspect of the invention is characterized by a projection type display apparatus comprising a plurality of image display elements, a first optical system for separating light from a light source into a plurality of light beams of mutually different colors and guiding the light beams of the respective colors into corresponding elements among the plurality of image display elements, and a second optical system for combining light from the light beams of the respective colors from the plurality of image display elements, said display apparatus projecting the light of the colors combined by the second optical system, wherein an optical element for improving purity of a predetermined color out of said colors by transmitting light in a region not less than a predetermined wavelength but intercepting light in the other region in the visible region or by transmitting light in a region not more than a predetermined wavelength but intercepting light in the other region in the visible region is arranged so as to be able to be put into or out of a predetermined optical path and/or so as to be able to be inclined with respect to the predetermined optical path; therefore, the apparatus can perform both the brightness-priority display and the color-reproduction-priority display and, because the optical element is the edge filter, the transmittance is higher at the wavelengths necessary for projection than in the case of the band cut filter and the reduction of light amount can be restrained to the minimum on the occasion of the color-reproduction-priority display.

In one aspect of the invention, the predetermined optical path is an optical path between a dichroic mirror group of the first optical system and the light source, whereby the two types of displays can be realized readily without degradation of display quality.

In one aspect of the invention, the predetermined optical path is an optical path defined by a dichroic mirror group of the first optical system, whereby the optical element can be put into or out of the optical path without need for an extra space and whereby the two types of displays can be realized without degradation of display quality.

BRIEF DESCRIPTION OF THE DRAWINGS

FIG. 4A and FIG. 4B are spectral distribution diagrams during inclusion and during exclusion of the dichroic filter as an optical element for switching of display mode, wherein FIG. 4A shows a state during inclusion while FIG. 4B a state during exclusion;

FIG. 6A, FIG. 6B, and FIG. 6C are wavelength spectral characteristic diagrams of two dichroic mirrors as the first optical system and a dichroic filter as an optical element for switching of display mode, wherein FIG. 6A and FIG. 6B are those of the dichroic mirrors and FIG. 6C is that of the dichroic filter;

FIG. 9A and FIG. 9B are spectral reflectance characteristic diagrams of coating layers on the both surfaces of the dichroic mirror, wherein FIG. 9A is the diagram of mirror DM32 on the upper surface and FIG. 9B that of mirror DM33 on the lower surface;

FIG. 11A, FIG. 11B, FIG. 11C, and FIG. 11D are spectral transmittance characteristic diagrams of the two dichroic mirrors and trimming filters, wherein FIG. 11A and FIG. 11B show those of the dichroic mirrors while FIG. 11C and FIG. 11D those of the trimming filters;

DETAILED DESCRIPTION OF THE PREFERRED EMBODIMENTS

The first embodiment of the present invention will be described referring to FIG. 1 to FIGS. 4A and 4B.

Figure 1:
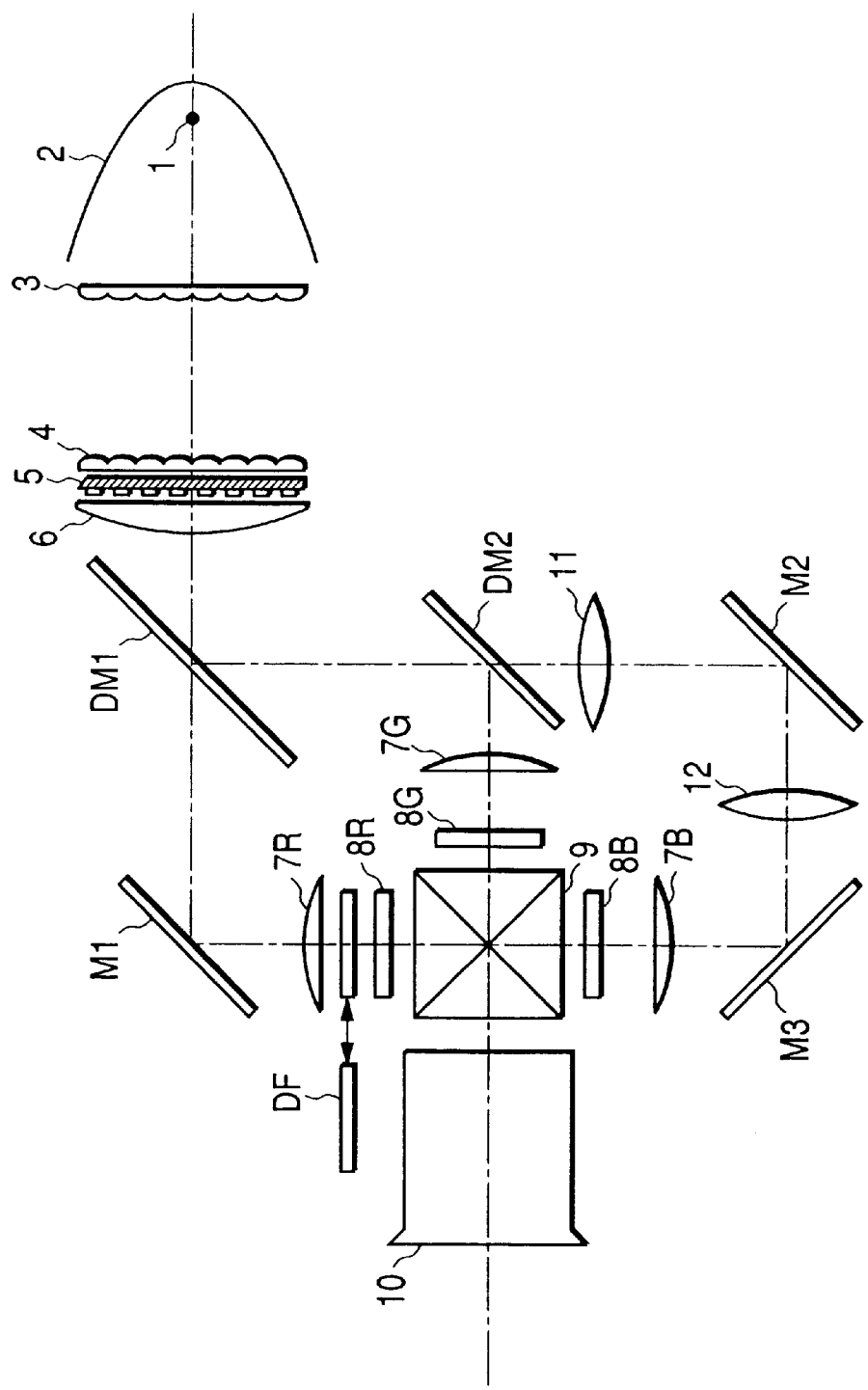
FIG. 1 is a structural diagram of a projection type display apparatus of the first embodiment according to the present invention.
Figure 10:
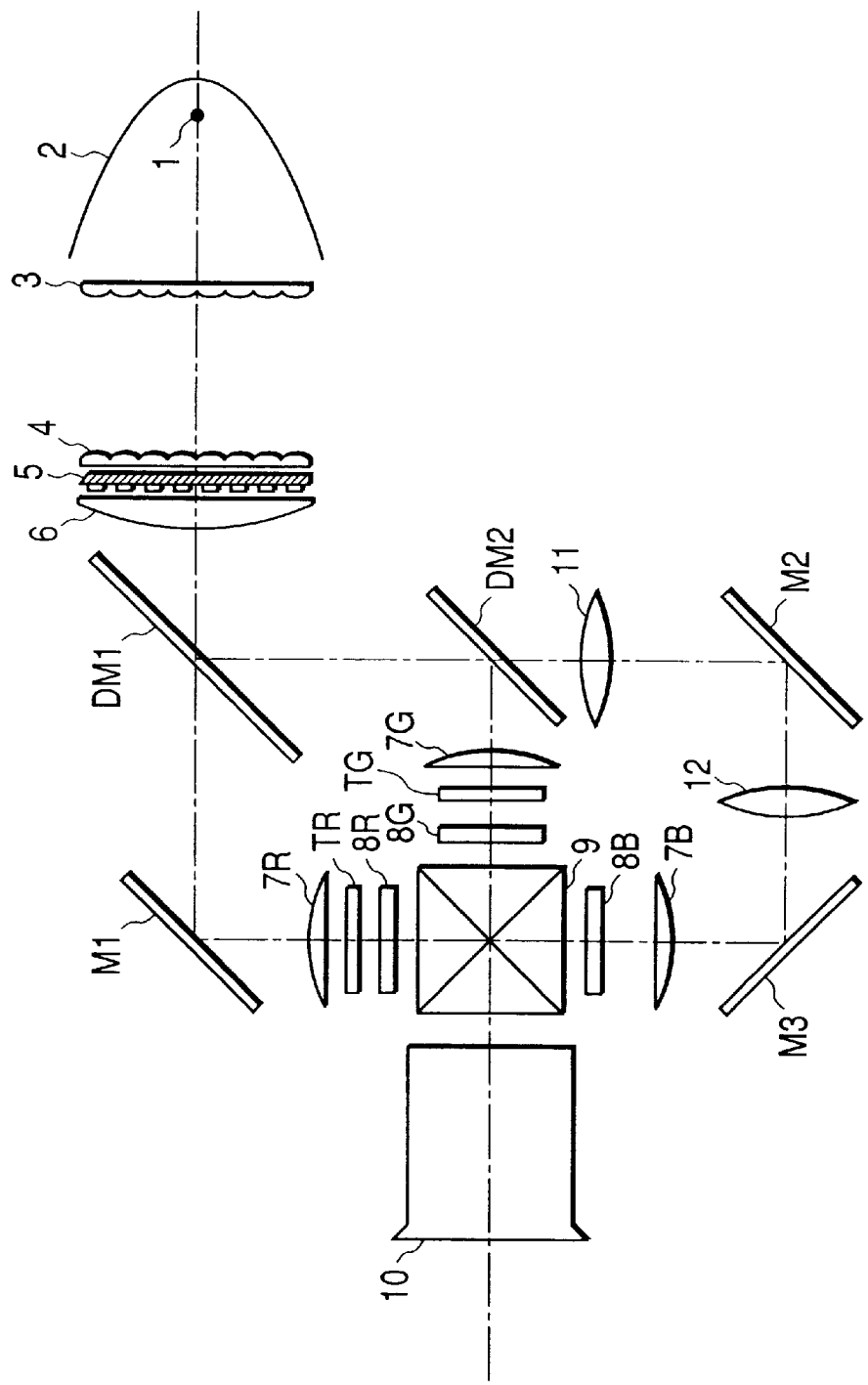
FIG. 10 is a structural diagram of the projection type display apparatus of the prior art example.
Figure 11A:
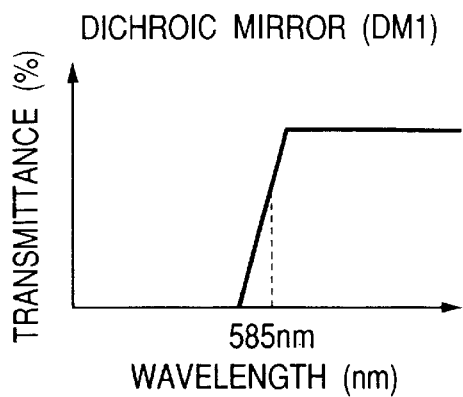
Figure 11B:
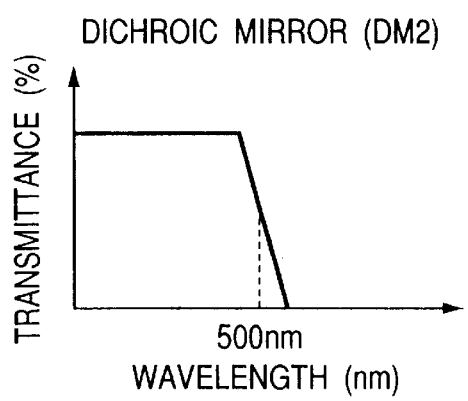
Figure 11C:
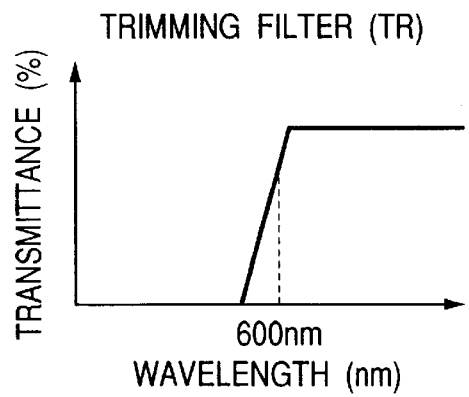
Figure 11D:
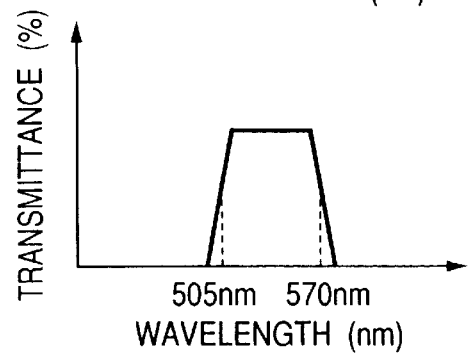

FIG. 1 is a structural diagram of the projection type display apparatus of the present embodiment, in which the same components as those in the prior art example illustrated in aforementioned FIG. 10 are denoted by the same reference symbols, and the description is focused on only different points in order to avoid redundant description of the same components.

In the present embodiment, the trimming filters TR, TG of the prior art example described previously are excluded, the trimming filter TR in the red wavelength path is replaced by a dichroic filter DF as an optical element for switching of display mode, and the dichroic filter DF is mounted on a mechanism capable of putting the filter in or out of the optical path. The other structure is similar to that in the prior art example described previously.

Figure 2:
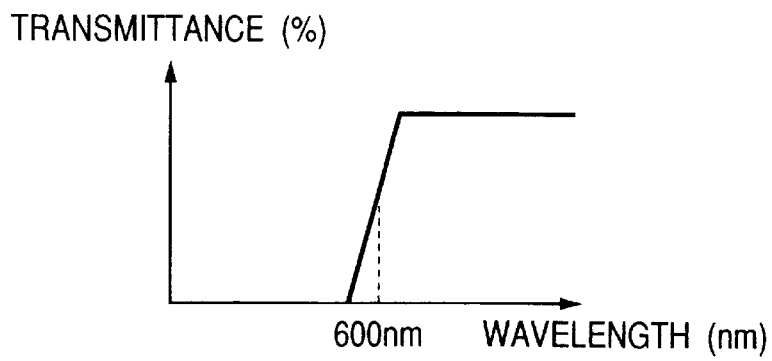
FIG. 2 is a wavelength spectral characteristic diagram of a dichroic filter as an optical element for switching of display mode.
Figure 3A:
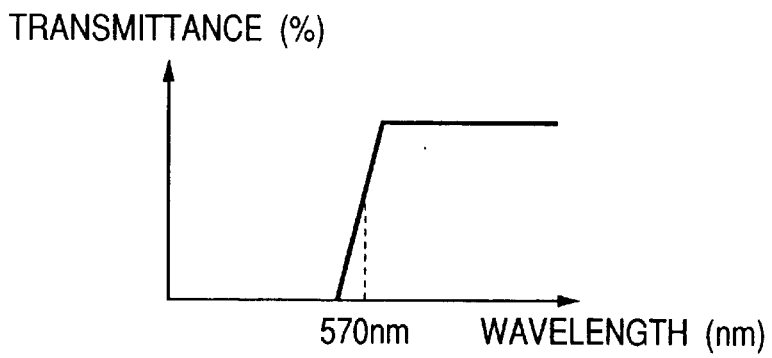
FIG. 3A and FIG. 3B are wavelength spectral characteristic diagrams of two dichroic mirrors as the first optical system.
Figure 3B:
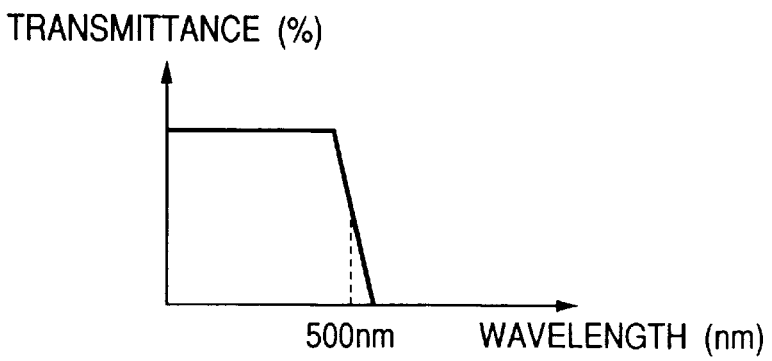

FIG. 2 shows the spectral transmittance characteristics of the dichroic filter DF and FIGS. 3A and 3B show the spectral transmittance characteristics of the respective dichroic mirrors DM1, DM2. These spectral transmittance characteristics are those of an example where a certain UHE lamp (available from Matsushita Electric Industrial Co., Ltd.: registered trademark) is used as a light source unit 1. It is, however, noted that various values can also be set according to required brightness and chromatic purity, the type of the light source, etc., without having to be limited to these values.

In the present embodiment constructed in the above structure, the white light emitted from the light source unit 1 having the reflector 2 travels through the fly-eye lenses 3 and 4, PS converter 5, condenser lens 6, etc. and thereafter the dichroic mirror DM1 as the first optical system transmits the red band light R but reflects the green and blue band light. Then the red band light transmitted by the dichroic mirror DM1 is reflected by the total reflection mirror M1 to change its optical path by 90° and then it travels through the field lens 7R into the liquid-crystal display unit 8R, in which the red band light is optically modulated according to an input signal. The light thus optically modulated is incident to the combining dichroic prism as the second optical system, and the dichroic prism 9 changes the optical path of the red light by 90° into the projection lens 10.

On the other hand, among the green and blue band light reflected by the dichroic mirror DM1 so as to change the optical path by 90°, the green band light G is reflected by the dichroic mirror DM2 as the first optical system to change its optical path by 90° and then it travels through the field lens 7G into the liquid-crystal display unit 8G, in which the green band light is optically modulated according to an input signal. The light thus optically modulated is incident to the combining dichroic prism and then into the projection lens 10. The blue band light B transmitted by the dichroic mirror DM2 travels via the condenser lens 11, total reflection mirror M2, relay lens 12, total reflection mirror M3, and field lens 7B into the liquid-crystal display unit 8B, in which the blue band light is optically modulated according to an input signal. The light thus optically modulated is incident to the combining dichroic prism, and the dichroic prism 9 changes the optical path of the blue light by 90° into the projection lens 10.

The trichromatic light combined by the combining dichroic prism is projected by the projection lens 10.

When the dichroic filter DF is not put in the irradiation optical path, the chromatic purity determined by the cut wavelengths of the dichroic mirrors DM1, DM2 is set so as to be lower than the chromatic purity necessary for video display but to be enough for large-screen display. When the dichroic filter DF is not put in the irradiation optical path, the light in the band of about 570 to 600 nm is also utilized as projection light, but the light near 585 nm is light that degrades the green purity and red purity.

Next, when the dichroic filter DF as an edge filter is put in the irradiation optical path, for example, where high-quality display with high chromatic purity is necessary as in the video display, the light in the band of about 570 to 600 nm does not emerge on the liquid-crystal display side, the light in the band of about 510 to 570 nm is used as light for displaying the green band, and the light in the band not less than about 600 nm is used as light for displaying the red band.

Figure 4A:
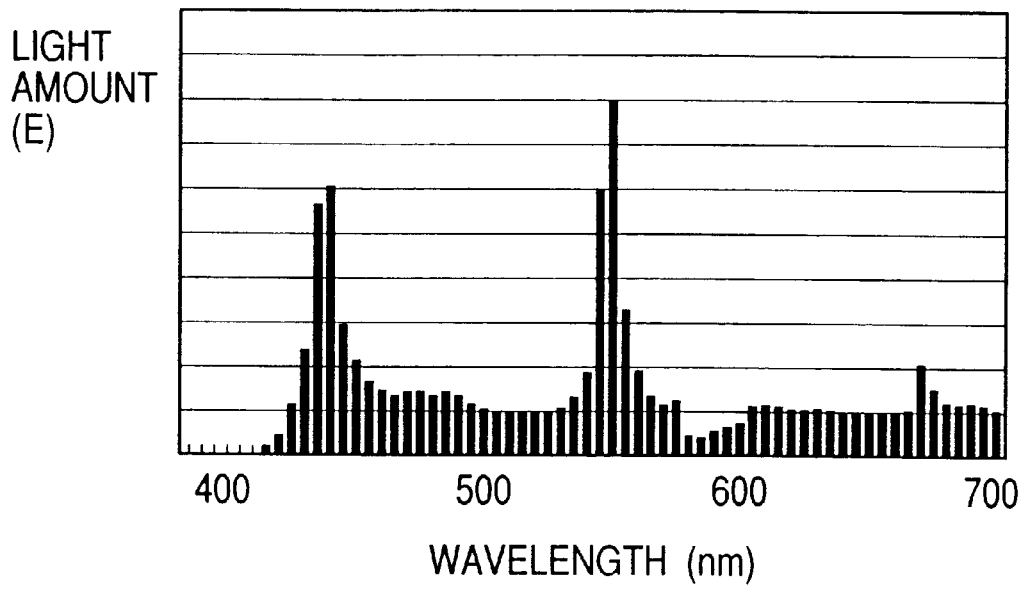
Figure 4B:
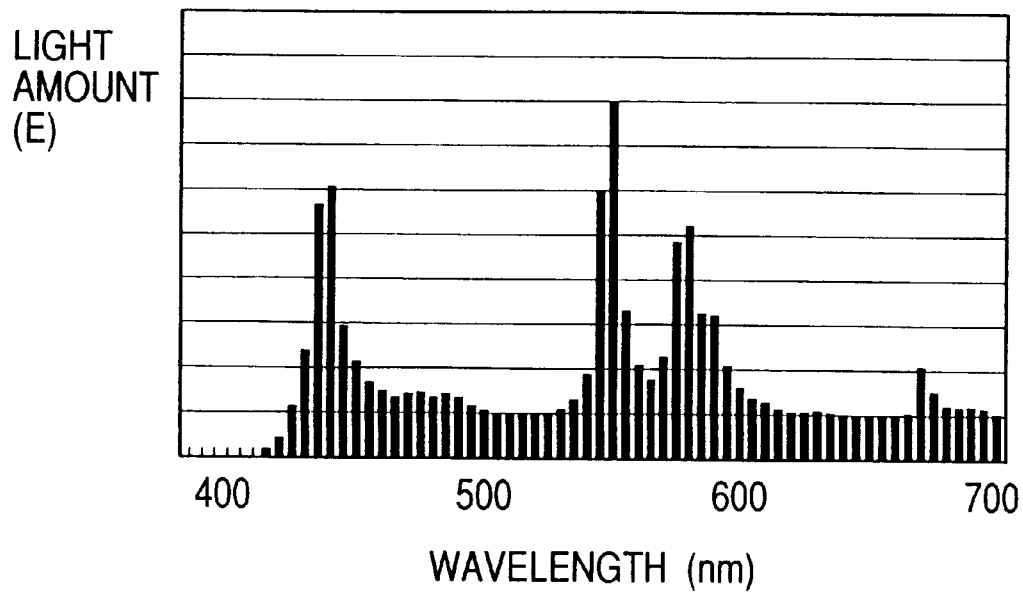

FIG. 4A and FIG. 4B show the spectral characteristics during inclusion and during exclusion, respectively, of the dichroic filter DF.

The chromatic purity can be improved by inclusion of the dichroic filter DF in the irradiation optical path in this way. However, when the light that degrades the chromatic purity is cut by the band cut filter, the light amount is lowered more than necessary, though the chromatic purity is improved. In the case of the dichroic filter DF, because it is an edge filter, the cut band and transmittance can be set so as to assure the chromatic purity and chromatic balance without great reduction of light amount.

In the present embodiment the dichroic filter DF is placed immediately before the liquid-crystal display unit 8R in the optical path of the red band light, but it may be interposed anywhere between the dichroic mirror DM1 and the liquid-crystal display unit 8R.

FIG. 5 and FIGS. 6A to 6C show the second embodiment of the present invention. For simplifying the description, the present embodiment will be described by assigning the same reference symbols to the same components as those in the first embodiment described above.

Figure 5:
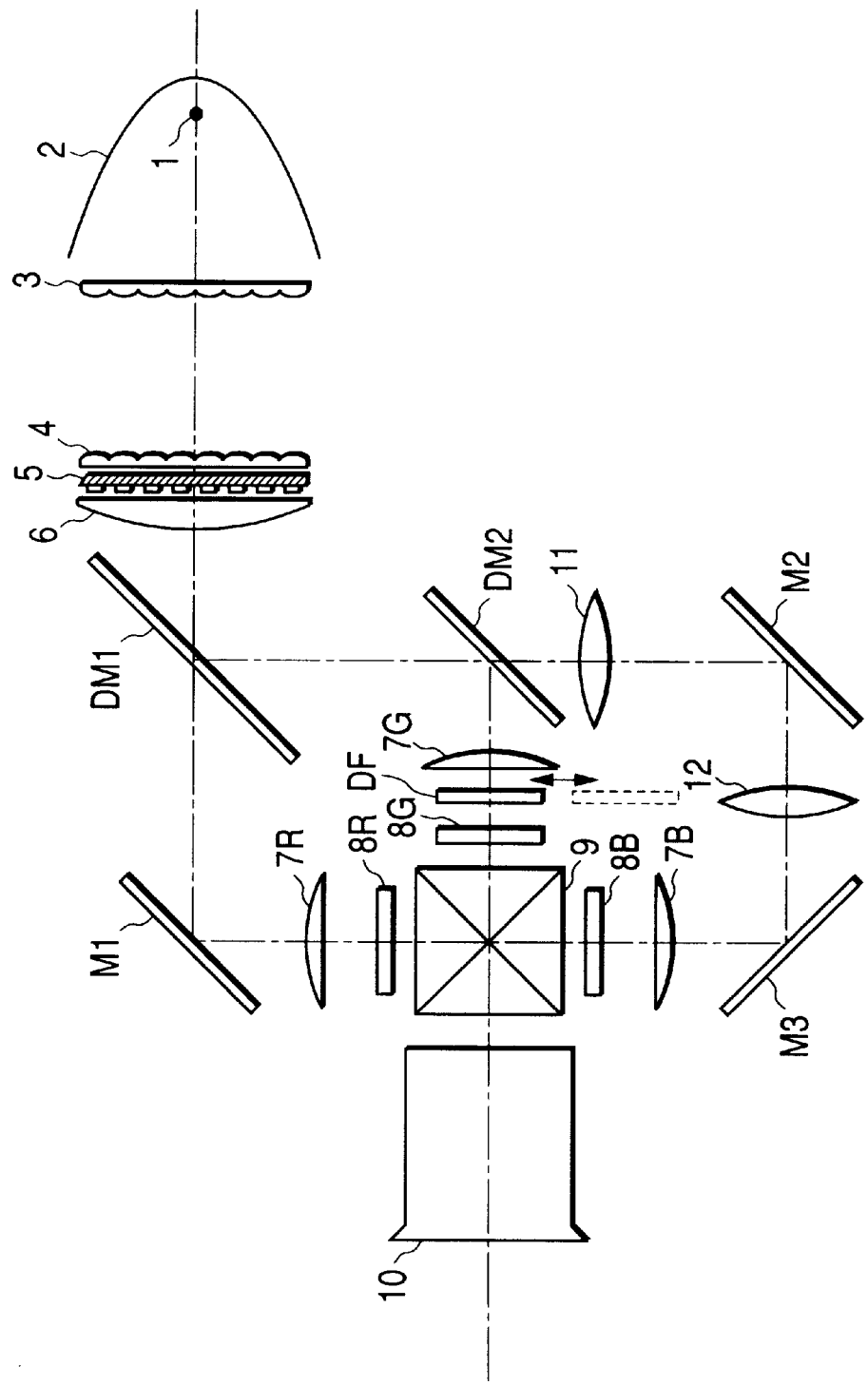
FIG. 5 is a structural diagram of a projection type display apparatus of the second embodiment of the present invention.

FIG. 5 is a structural diagram of the projection type display apparatus of the present embodiment.

In the present embodiment the dichroic filter DF as an optical element for switching of display mode is placed immediately before the liquid-crystal display unit 8G in the optical path of the green band light, instead of that in the optical path of the red band light in the first embodiment, and the dichroic filter DF is mounted on the mechanism capable of putting the filter in or out of the optical path. The other structure and operation are similar to those in the first embodiment.

Figure 6A:
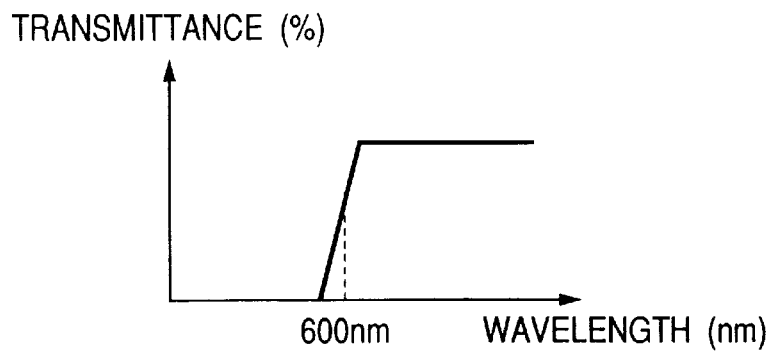
Figure 6B:
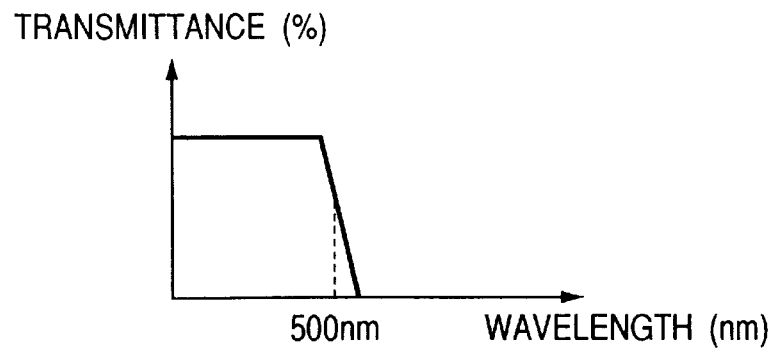
Figure 6C:
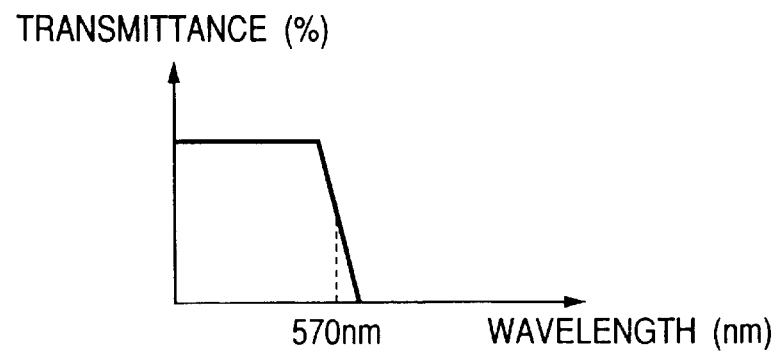

In the present embodiment the spectral transmittance characteristics of the dichroic mirrors DM1, DM2 and the dichroic filter DF are those shown in FIG. 6A, in FIG. 6B, and in FIG. 6C, respectively. It is, however, noted that various values can also be set according to the required brightness and chromatic purity, the type of the light source, etc., without having to be limited to those values.

In the present embodiment the dichroic filter DF is placed immediately before the liquid-crystal display unit 8G in the optical path of the green band light, but the filter may also be interposed anywhere between the dichroic mirror DM1 and the liquid-crystal display unit 8G.

It is also noted that the spectral transmittance characteristics of the dichroic mirror DM1 do not have to be limited to the values in each of the above embodiments and that the apparatus may also be provided with a plurality of dichroic filters DF as occasion may demand.

Figure 17:
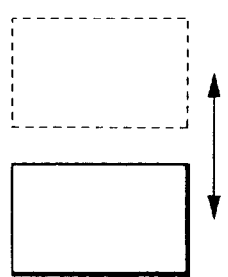
FIG. 17 is a diagram to show an example of switching movement directions of the optical element for switching of display mode.
Figure 18:
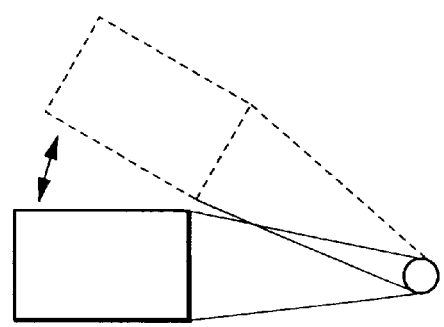
FIG. 18 is a diagram to show another example of switching movement directions of the optical element for switching of display mode.

In each of the above embodiments moving directions in which the dichroic filter DF or the dichroic mirror DM3, DM6 (explained later) is inserted into or retracted out of the optical path can be either vertical directions (FIG. 17) or horizontal directions as long as they are directions perpendicular to the optical axis, and the dichroic filter DF is put into or out of the optical path, using the driving mechanism adapted to for the moving directions. It is also needless to mention that the filter DF can be put into or out of the optical path by a pivoting mechanism for pivoting the member holding the dichroic filter DF on the center at a certain point (FIG. 18).

FIG. 7 to FIGS. 9A, 9B show the third embodiment of the present invention.

Figure 7:
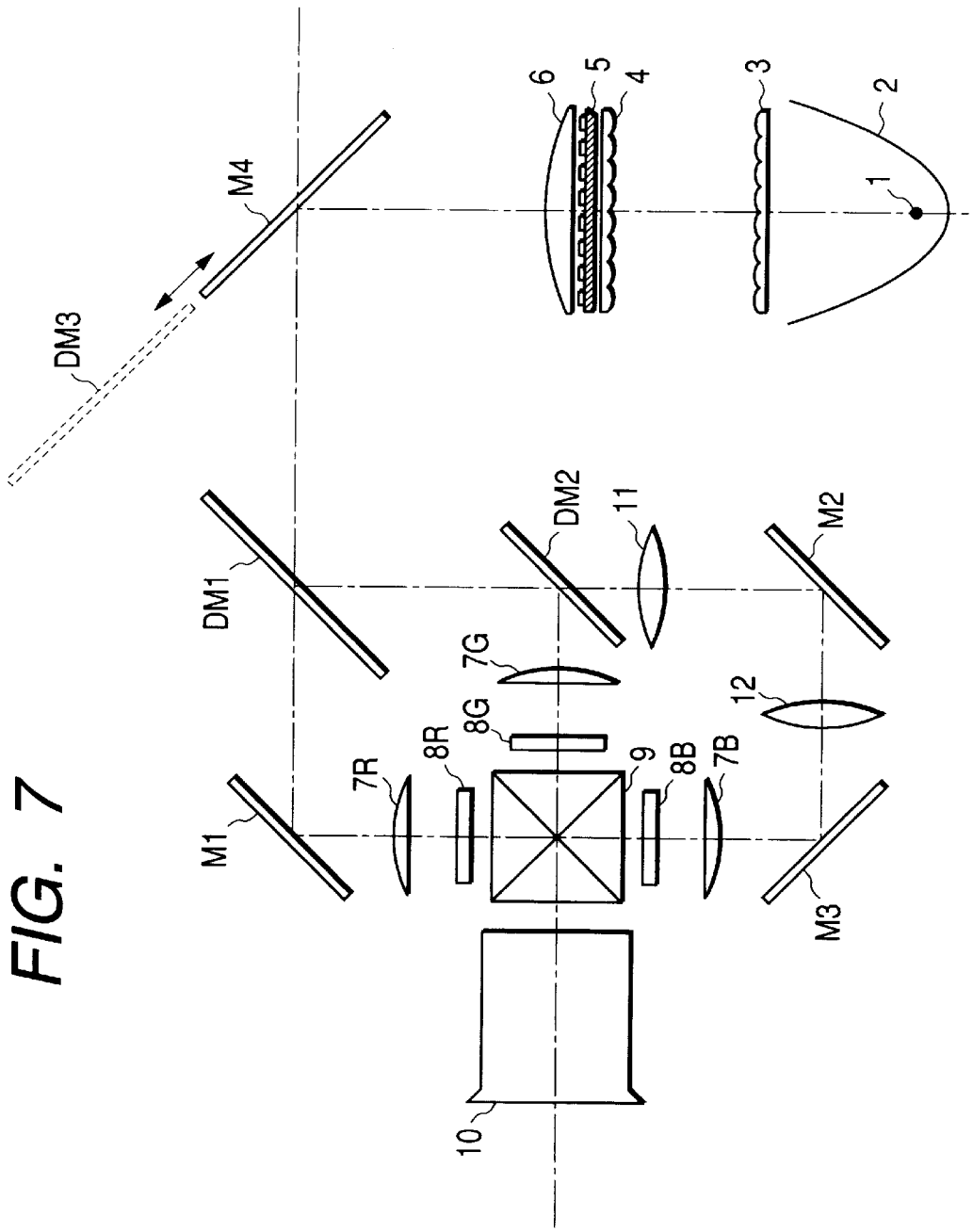
FIG. 7 is a structural diagram of a projection type display apparatus of the third embodiment of the present invention.
Figure 8:
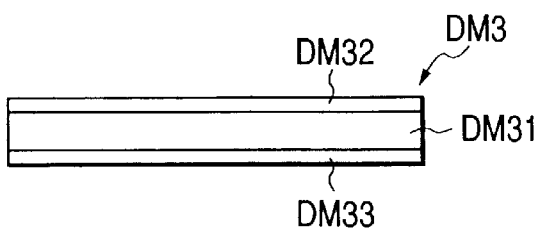
FIG. 8 is a structural diagram of a dichroic mirror as an optical element for switching of display mode.

FIG. 7 is a structural diagram of the projection type display apparatus of the present embodiment and FIG. 8 is a structural diagram of a dichroic mirror as an optical element for switching of display mode.

In the present embodiment a reflecting mirror M4 and the dichroic mirror DM3 as an optical element for switching of display mode are arranged so as to be able to replace each other in the optical path between the condenser lens 6 and the dichroic mirror DM1. The other structure is similar to that in the prior art example described previously.

The above structure permits the single apparatus to implement both the brightness-priority display and the color-reproduction-priority display.

Figure 9A:
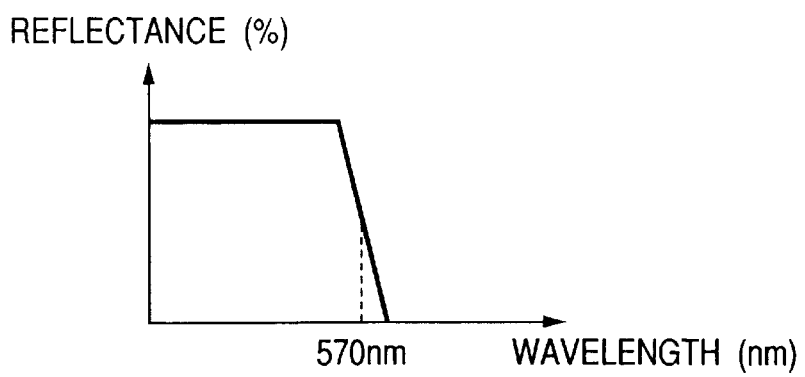
Figure 9B:
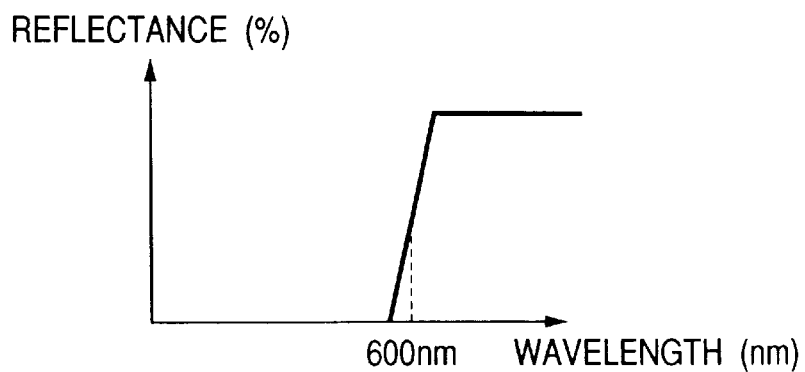

As illustrated in FIG. 8, the dichroic mirror DM3 has such structure that the upper and lower surfaces of a flat substrate DM31 are coated with respective dichroic coating layers DM32, DM33, the dichroic coating layer DM32 has the spectral reflectance characteristics to reflect the light in the band not more than about 570 nm as illustrated in FIG. 9A, and the dichroic coating layer DM33 has the spectral reflectance characteristics to reflect the light in the band not less than about 600 nm as illustrated in FIG. 9B. Therefore, they can cut the light in the wavelength region of about 570 nm to 600 nm.

When the edge filter is constructed as described above, the reflectance is higher at the wavelengths necessary for projection than in the case of coating of a single dichroic mirror with band pass characteristics, so that the reduction of light amount can be minimized on the occasion of the color-reproduction-priority display.

Figure 12:
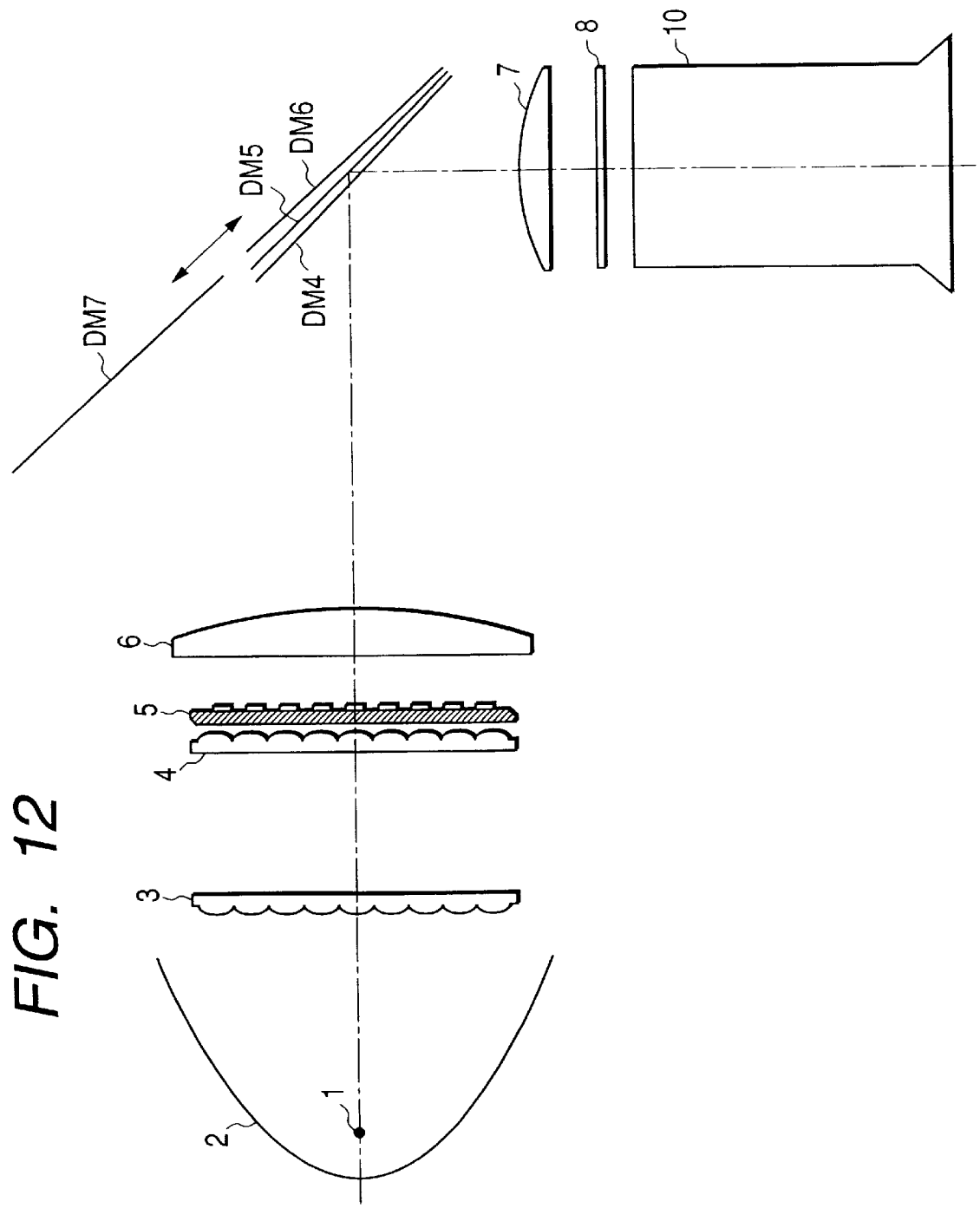
FIG. 12 is a structural diagram of the fourth embodiment of the present invention using only one liquid-crystal display element.

The above embodiments showed the examples of the full-color projection type display apparatus using a plurality of liquid-crystal display elements, but it should be noted that the present invention is not limited to such three-chip type liquid-crystal projectors. The invention can also be applied to single-chip full-color projection type display apparatus using a single liquid-crystal display element provided with a microlens array on the light incidence side. This will be described below as the fourth embodiment of the present invention. FIG. 12 is a structural diagram of the projection type display apparatus according to the fourth embodiment and FIGS. 13A to 13D show spectral transmittance characteristics of dichroic mirrors DM4 to DM7 of FIG. 12.

Figure 13A:
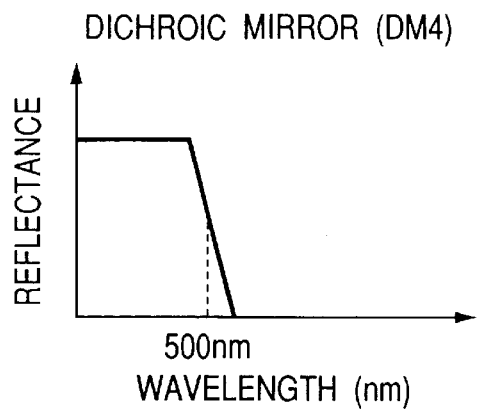
FIG. 13A, FIG. 13B, FIG. 13C, and FIG. 13D are diagrams to show wavelength spectral characteristics of the dichroic mirrors in the fourth embodiment.
Figure 13B:
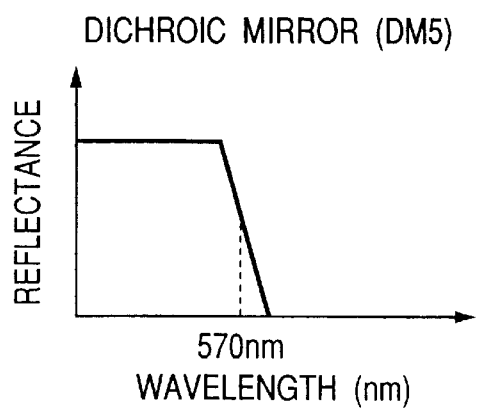
Figure 13C:
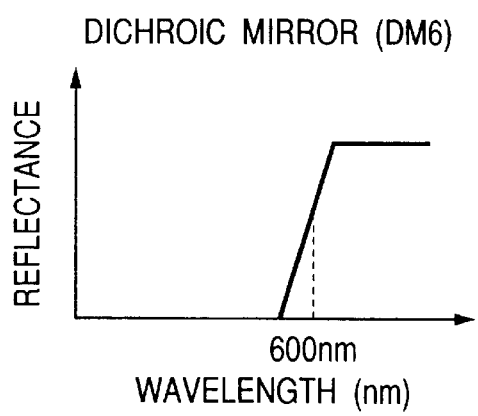
Figure 14:
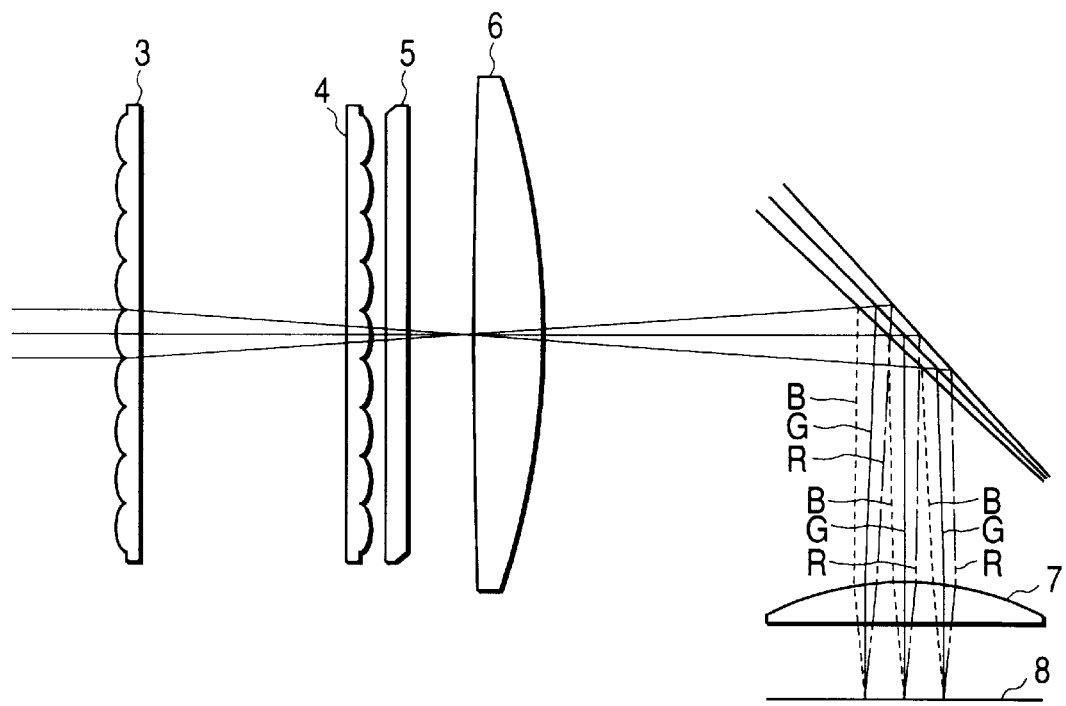
FIG. 14 is a schematic diagram of optical paths in the fourth embodiment.
Figure 15:
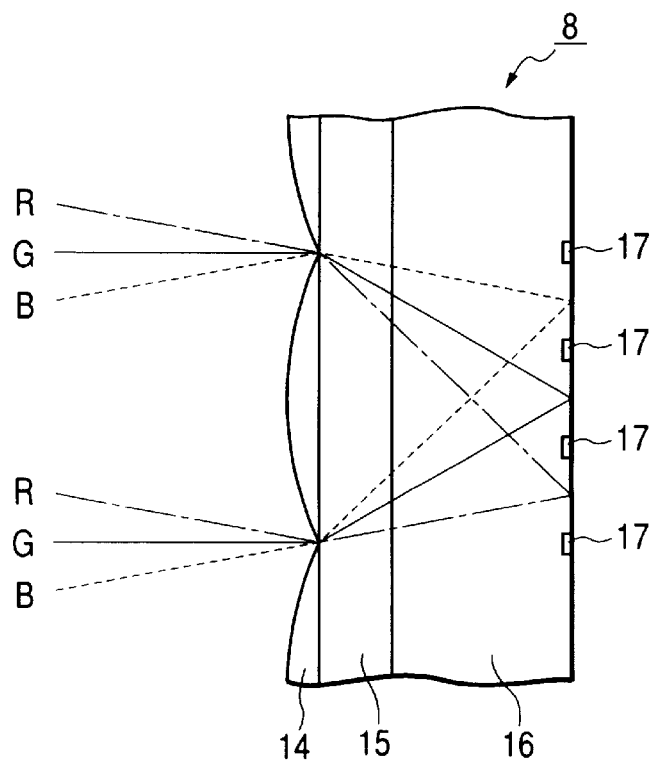
FIG. 15 is an internal structural diagram and optical path diagram of the liquid-crystal display element of FIG. 12.
Figure 16:
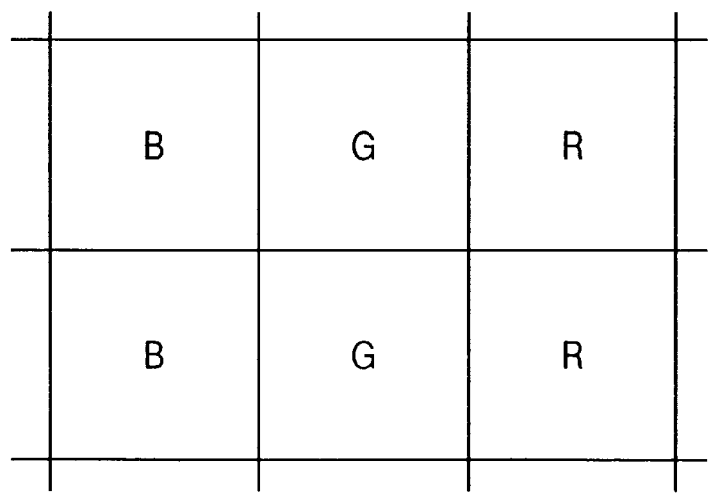
FIG. 16 is a diagram to show the positional relation between color band beams and pixels of the liquid-crystal display element of FIG. 12.

FIG. 14 and FIG. 15 show schematic optical paths of the fourth embodiment and the internal structure and optical path diagram of the liquid-crystal display element 8, respectively. The dichroic mirrors DM4 to DM6 having the spectral reflectance characteristics illustrated in FIGS. 13A to 13C separate the white light from the lamp into beams of the blue, green, and red bands, and these blue, green, and red band beams irradiate the microlens array 14 provided on the light source side of the liquid-crystal display element 8, at respective incident angles different from each other. A liquid crystal layer 16 of the liquid-crystal display element 8 is divided into pixels corresponding to the blue, green, and red band beams as illustrated in FIG. 16, and each pixel is driven independently of other pixels. After the blue, green, and red band beams pass through the microlens array 14, they are distributed and condensed every color on the corresponding pixels described above. Numeral 15 designates a glass substrate and 17 a black matrix.

Figure 13D:
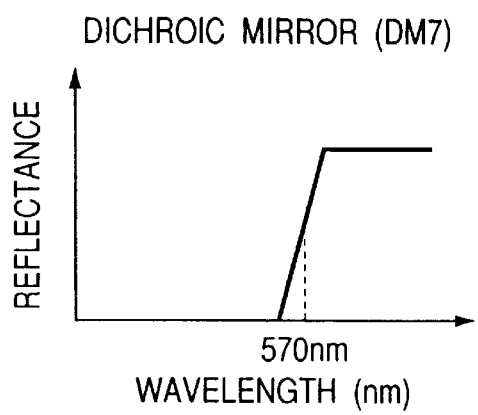

The dichroic mirror DM6 having the spectral reflectance characteristics of FIG. 13C is arranged to be replaced by the dichroic mirror DM7 having the spectral reflectance characteristics of FIG. 13D in the optical path, whereby the single apparatus can implement the color-reproduction-priority display by placing DM6 in the optical path and the brightness-priority display by placing DM7 in the optical path.

While DM6 is in the optical path, the light in the region of 570 nm to 600 nm is not used, so as to implement the color-reproduction-priority display; while DM7 is in the optical path, the light in the region of 570 nm to 600 nm is used, so as to implement the brightness-priority display. DM7 does not have to be limited to the dichroic mirror, but it may also be an ordinary metal mirror.

Besides the provision of the mechanism for putting the dichroic filter or the dichroic mirror into or out of the irradiation optical path, as described above, a plurality of display modes can also be implemented by provision of a mechanism for varying an angle of inclination to the optical path by inclining the dichroic filter or the dichroic mirror for switching of display mode in a predetermined optical path of parallel light. The insertion/retraction or the inclination of the edge filter (dichroic filter or dichroic mirror) for switching of display mode can be effected manually or by electric power in combination of a power generator with a power transmitter.

In each of the above embodiments the moving directions in which the dichroic filter DF or the dichroic mirror DM3, DM6 is put into or out of the optical path can be either the vertical directions (FIG. 17) or the horizontal directions as long as they are directions perpendicular to the optical axis, and the filter DF is put into or out of the optical path, using the driving mechanism adapted to the moving directions. It is needless to mention that the filter DF may be put into or out of the optical path by the pivoting mechanism for pivoting the member holding the dichroic filter DF or the dichroic mirror DM3, DM6, on the center at a certain point (FIG. 18).

Each of the above embodiments employed the liquid-crystal display elements (display units) as image display elements, but the present invention permits the apparatus to be constructed using the image display elements of other types, for example, using reflection type display elements in which small deformable mirrors are arranged two-dimensionally, or the like.

As described above, the present invention can improve the brightness on the occasion of the color-reproduction-priority display in the projection type display apparatus capable of selectively carrying out the brightness-priority display and the color-reproduction-priority display, as compared with the conventional apparatus.

What is claimed is:

1. A projection type display apparatus which has a brightness-priority display mode and a color-reproduction-priority display mode and in which light from a light source is seperated into a plurality of light beams of mutually different colors, the light beams of the respective colors are guided into corresponding pixel groups among a plurality of pixel groups, and the light beams of the respective colors from the plurality of pixel groups are projected, wherein purity of at least one color is made variable by use of an optical element which is adapted to transmit light in a wavelength region exceeding a predetermined wavelength and intercept light in the remainder in the visible region or which is adapted to transmit light in a wavelength region below a predetermined wavelength and intercept light in the remainder in the visible region.

2. A projection type display apparatus which has a brightness-priority display mode and a color-reproduction-display mode and in which light from a light source is seperated into a plurality of light beams of mutually different colors, the light beams of the respective colors are guided into corresponding pixel groups among a plurality of pixel groups, and the light beams of the respective colors from the plurality of pixel groups are projected, said display apparatus including an optical element which is adapted to transmit light in a wavelength region exceeding a predetermined wavelength and intercept light in the remainder in the visible region or which is adapted to transmit light in a wavelength region below a predetermined wavelength and intercept light in the remainder in the visible region enhance purity of a predetermined color, wherein said optical element is so arranged as to be able to be insertable into and retractable from a predetermined optical path and/or is so arranged as to be tiltable with respect to the predetermined optical path.

3. A projection type display apparatus which has a brightness-priority display mode and a color-reproduction-display mode and which comprises:

a plurality of image display elements;

a first optical system for separating light from a light source into a plurality of light beams of mutually different colors and guiding the light beams of the respective colors into corresponding elements among the plurality of image display elements; and a second optical system for combining light from the light beams of the respective colors from the plurality of image display elements, said display apparatus projecting the light of the colors combined by the second optical system, wherein said projection type display apparatus includes an optical element which is adapted to transmit light in a wavelength region exceeding a predetermined wavelength and intercept light in the remainder in the visible region or which is adapted to transmit light in a wavelength region below a predetermined wavelength and intercept light in the remainder in the visible region so as to enhance purity of a predetermined color out of said colors, and said optical element is so arranged as to be able to be insertable into and retractable from a predetermined optical path and/or said optical element is so arranged as to be able to be tiltable with respect to the predetermined optical path.

4. The projection type display apparatus according to claim 3, wherein said predetermined optical path is an optical path between a dichroic mirror group of the first optical system and the light source.

5. The projection type display apparatus according to claim 3, wherein said predetermined optical path is an optical path defined by a dichroic mirror group of the first optical system.

* * * * *

UNITED STATES PATENT AND TRADEMARK OFFICE
CERTIFICATE OF CORRECTION

PATENT NO. : 6,212,013 B1
DATED : April 3, 2001
INVENTOR(S) : Hiroyuki Kodama and Atsushi Okuyama It is certified that error appears in the above-identified patent and that said Letters Patent is hereby corrected as shown below:

<u>Title page,</u>
Item [30], please delete "Aug. 27, 1999" before (JP) 10-256118 and substitute therefore -- Aug. 27, 199<u>8</u> --

Signed and Sealed this

Sixth Day of November, 2001

Attest:

*Nicholas P. Godici*

NICHOLAS P. GODICI
*Attesting Officer    Acting Director of the United States Patent and Trademark Office*